(12) United States Patent
Tang et al.

(10) Patent No.: US 7,437,691 B2
(45) Date of Patent: Oct. 14, 2008

(54) VLSI ARTWORK LEGALIZATION FOR HIERARCHICAL DESIGNS WITH MULTIPLE GRID CONSTRAINTS

(75) Inventors: Xiaoping Tang, Elmsford, NY (US); Xin Yuan, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 11/279,283

(22) Filed: Apr. 11, 2006

(65) Prior Publication Data

US 2007/0240088 A1    Oct. 11, 2007

(51) Int. Cl.
*G06F 17/50*    (2006.01)

(52) U.S. Cl. ............ 716/2; 716/7; 716/10; 703/2; 703/6; 703/16

(58) Field of Classification Search .......... 716/2, 716/7, 10; 703/2, 6, 16
See application file for complete search history.

(56) References Cited

U.S. PATENT DOCUMENTS

| | | | |
|---|---|---|---|
| 5,281,558 A * | 1/1994 | Bamji et al. ............ | 716/2 |
| 5,381,343 A * | 1/1995 | Bamji et al. ............ | 716/2 |
| 5,469,367 A * | 11/1995 | Puri et al. ............ | 716/18 |
| 5,493,509 A * | 2/1996 | Matsumoto et al. .......... | 716/2 |
| 5,636,132 A | 6/1997 | Kamdar | |
| 5,856,927 A * | 1/1999 | Greidinger et al. .......... | 716/12 |
| 6,122,443 A * | 9/2000 | Nishikawa ............ | 716/8 |
| 6,189,132 B1 | 2/2001 | Heng et al. | |
| 6,317,864 B1 * | 11/2001 | Kikuchi et al. ............ | 716/11 |
| 6,477,693 B1 * | 11/2002 | Marchenko et al. .......... | 716/14 |
| 6,587,992 B2 * | 7/2003 | Marple ............ | 716/2 |
| 6,910,196 B2 * | 6/2005 | Cocchini ............ | 716/6 |
| 6,948,143 B2 * | 9/2005 | Donelly et al. ............ | 716/9 |
| 6,986,109 B2 * | 1/2006 | Allen et al. ............ | 716/2 |
| 7,047,504 B2 * | 5/2006 | Kawano ............ | 716/2 |
| 7,137,097 B1 * | 11/2006 | Aji et al. ............ | 716/12 |
| 7,155,697 B2 * | 12/2006 | Teig et al. ............ | 716/13 |
| 7,187,992 B2 * | 3/2007 | Tuszynski ............ | 700/97 |
| 7,225,421 B2 * | 5/2007 | Migatz et al. ............ | 716/13 |
| 7,239,991 B2 * | 7/2007 | Tuszynski ............ | 703/2 |
| 7,302,651 B2 * | 11/2007 | Allen et al. ............ | 716/3 |

(Continued)

OTHER PUBLICATIONS

Poo et al., "Time-Varying Maximum Transition Run Constraints", International Symposium on Information Theory, Sep. 4-9, 2005, pp. 1468-1472.*

(Continued)

*Primary Examiner*—Phallaka Kik
(74) *Attorney, Agent, or Firm*—Richard Kotulak; Greenblum & Bernstein P.L.C.

(57) ABSTRACT

A system and method are disclosed for legalizing a flat or hierarchical VLSI layout to meet multiple grid constraints and conventional ground rules. Given a set of ground rules with multiple grid constraints and a VLSI layout (either hierarchical or flat) which is layout-versus-schematic (LVS) correct but may not be ground rule correct, the system and method provide a legalized layout which meets the multiple grid constraints while maintaining LVS correctness and fixing the ground rule errors as much as possible with minimum layout perturbation from the input design. The system and method support multiple grid pitch constraints for hierarchical design, and provide for LVS correctness to be maintained while an on-grid solution possibly with some spacing violations.

15 Claims, 7 Drawing Sheets

U.S. PATENT DOCUMENTS

| | | | |
|---|---|---|---|
| 2003/0009728 A1* | 1/2003 | Marple | 716/2 |
| 2003/0177454 A1* | 9/2003 | Kawano | 716/2 |
| 2004/0044979 A1* | 3/2004 | Aji et al. | 716/13 |
| 2004/0225981 A1* | 11/2004 | Cocchini | 716/9 |
| 2004/0225982 A1* | 11/2004 | Donelly et al. | 716/9 |
| 2004/0230922 A1* | 11/2004 | Allen et al. | 716/2 |
| 2005/0125748 A1 | 6/2005 | Gray et al. | |
| 2005/0132306 A1* | 6/2005 | Smith et al. | 716/1 |
| 2006/0101356 A1* | 5/2006 | Allen et al. | 716/3 |
| 2006/0190899 A1* | 8/2006 | Migatz et al. | 716/13 |
| 2007/0150846 A1* | 6/2007 | Furnish et al. | 716/8 |
| 2007/0204252 A1* | 8/2007 | Furnish et al. | 716/10 |
| 2007/0245283 A1* | 10/2007 | Allen et al. | 716/10 |
| 2007/0277129 A1* | 11/2007 | Allen et al. | 716/2 |

OTHER PUBLICATIONS

Xin Yuan et al., "Technology Migration Technique for Designs with Strong RET-driven Layout Restrictions", ISPD '05, Apr. 3-6, 2005, San Francisco, California, USA, 8 pages.

* cited by examiner

Hierarchy tree of the design with height of 3

VLSI ARTWORK LEGALIZATION FOR HIERARCHICAL DESIGNS WITH MULTIPLE GRID CONSTRAINTS

FIELD OF THE INVENTION

The invention relates to object layouts and, more particularly, to a system and method for legalizing flat and/or hierarchical layouts with multiple grid constraints.

BACKGROUND OF INVENTION

With the advance of ultra deep submicron technology, manufacturability has become one of the major problems in very large scale integrated (VLSI) circuit design. Because the ability to control the physical properties of fabricated devices and interconnects is decreasing, the variability of finally printed shapes and their physical properties is increasing. Therefore, design for manufacturability (DFM) has become one of the most challenging topics among designers and researchers. Post-layout manufacturability enhancement techniques, such as optical proximity correction (OPC) and resolution enhancement techniques (RET), have been a key step to compensate for shape variation and ensure the manufacturability of designs. However, these post-layout processes are very expensive. The complexity of these techniques is increasing as well. For the emerging technologies (65 nm and beyond), the computation cost and complexity of the post-layout processes are becoming the bottle-necks in the design-to-silicon flow.

Therefore, regular layout styles have been proposed to improve the manufacturability and achieve manageable post-layout processing complexity. However, pursuit of regular layout styles has caused chip layout to become subject to complex rules governing, among other things, the size, shape, and location of objects on process layers. Compliance with these rules is important to ensure chip functionality and manufacturability.

A conventional shape-based layout includes a set of polygons, each of which is associated with a layer, including diffusion, polysilicon (poly), metals, contact, vias, etc. Layouts can be flat or hierarchical and, as described above, may be subject to design ground rules to ensure manufacturability. Typically, ground rules include spacing rules specifying the minimum space between objects, length rules specifying the minimum length of some objects, width rules specifying the minimum width of some objects, and methodology rules specifying the design requirement for assembling cells.

An effective methodology in pursuing regular layout styles to deal with computation cost and complexity of post-layout process is to impose restrictive design rules (RDRs) which require layout objects to be placed at a set of pitch grids. Such restrictive design rules are also called grid constraints. Grid constraints require that a specified portion of an object be located on a grid that is defined on the layout. A layout may have single or multiple grid constraints.

Techniques for designing layouts that comply with ground rules and grid constraints include compaction and minimum layout perturbation-based legalization. Usually they are performed in two successive steps, first in X direction and then in Y direction, or vice versa, in order to obtain a legalized solution to a two-dimensional layout. The compaction technique which is based on the longest path computation minimizes the area of the layout by relocating objects while satisfying rules and constraints. However, so far the compaction technique does not handle the multiple grid constraints for a hierarchical layout. Furthermore, when grid constraints is taken into account, the iteration bound which is used to check whether there is a feasible compaction solution for a flat layout to satisfy the given constraints (e.g., whether there is a positive cycle in the grid longest path) is not accurate.

The minimum layout perturbation-based legalization technique is an alternative to compaction. The minimum layout perturbation-based legalization technique is described in U.S. Pat. No. 6,189,132, the disclosure of which is hereby incorporated by reference in its entirety. The minimum layout perturbation-based legalization technique attempts to improve a given layout by correcting ground rule violations while changing the original layout as little as possible. The minimum layout perturbation-based legalization technique is advantageous because it addresses cases with conflicting rules that cause positive cycles and which cannot be handled by longest path-based compaction techniques. The minimum layout perturbation-based legalization technique does not consider grid constraints.

Accordingly, there exists a need in the art to overcome the deficiencies and limitations described hereinabove.

SUMMARY OF THE INVENTION

In a first aspect of the invention, a method includes determining an ordering of a plurality of nodes in the constraint graph according to their respective locations in a layout. The method further includes computing a lower bound and an upper bound for at least a first of the plurality of ordered nodes, and, based on the computing, placing the first node of the plurality of ordered nodes on any one of a plurality of grids that is nearest the original location and between the computed lower bound and the computed upper bound of the first node.

In another aspect of the invention, a method of legalizing a layout of an integrated circuit having multiple grid constraints is provided. The method includes formulating a linear programming problem based upon a variable set and a constraint set, solving the linear programming problem to provide an initial solution, and, based upon the initial solution, producing on-grid results for objects in the layout. The steps of the method may be embodied in a computer program product.

In a further aspect of the invention, a system is provided for legalizing a layout of an integrated circuit having multiple grid constraints. The system includes a device for formulating a linear programming problem based upon a variable set and a constraint set, a global solver for solving the linear programming problem to provide an initial solution, and a local solver for producing on-grid results for objects in the layout based upon the initial solution.

BRIEF DESCRIPTION OF THE DRAWINGS

The foregoing will be better understood from the following detailed description of embodiments of the invention with reference to the drawings, in which.

DETAILED DESCRIPTION OF EMBODIMENTS OF THE INVENTION

The invention is directed to a system and method for legalizing a flat or hierarchical VLSI layout to meet multiple grid constraints and conventional ground rules. Given a set of ground rules with multiple grid constraints and a VLSI layout (either hierarchical or flat) which is layout-versus-schematic (LVS) correct but may not be ground rule correct, the invention provides a legalized layout which meets the multiple grid constraints while maintaining LVS correctness and fixing the ground rule errors as much as possible with minimum layout perturbation from the input design.

In legalizing a flat VLSI layout to meet multiple grid constraints and conventional ground rules, embodiments of the invention use a minimum perturbation-driven graph-based grid legalization system and method to place objects on-grid while satisfying ground rule constraints. In embodiments of the invention, the system and method detects the existence of positive cycles by determining the iteration bound for computing the grid longest path on a directed graph, and resolves conflicts when a positive cycle exists.

In legalizing a hierarchical VLSI layout to meet multiple grid constraints and conventional ground rules, embodiments of the invention comprise integrating a global solver and a local solver to handle hierarchical constraints and multiple grid constraints. In embodiments, the global solver is used to provide an initial solution without grid constraints, and the local solver is used to meet the grid constraints. By using the invention, it is now possible to legalize flat and hierarchical layouts with multiple grid constraints.

Figure 1:
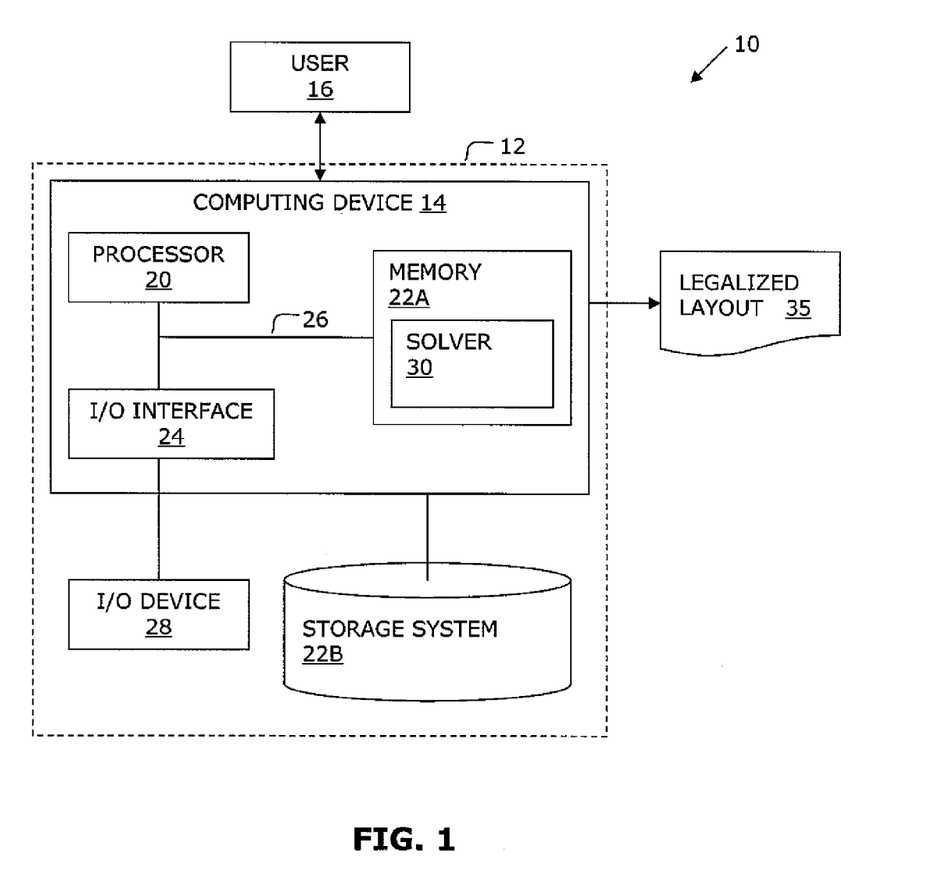
FIG. 1 shows an environment of the invention.

FIG. 1 shows an illustrative environment 10 for managing the processes in accordance with embodiments of the invention. To this extent, the environment 10 includes a computer infrastructure 12 that can perform the processes described herein. In particular, the computer infrastructure 12 is shown including a computing device 14 that comprises a solver 30, which makes computing device 14 operable to perform the processes described herein. The computing device 14 is shown including a processor 20, a memory 22A, an input/output (I/O) interface 24, and a bus 26. Further, the computing device 14 is shown in communication with an external I/O device/resource 28 and a storage system 22B. As is known in the art, in general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

In any event, the computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in other embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in one embodiment, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols. As discussed herein, the solver 30 enables computer infrastructure 12 to create the legalized layout 35.

Figure 2:
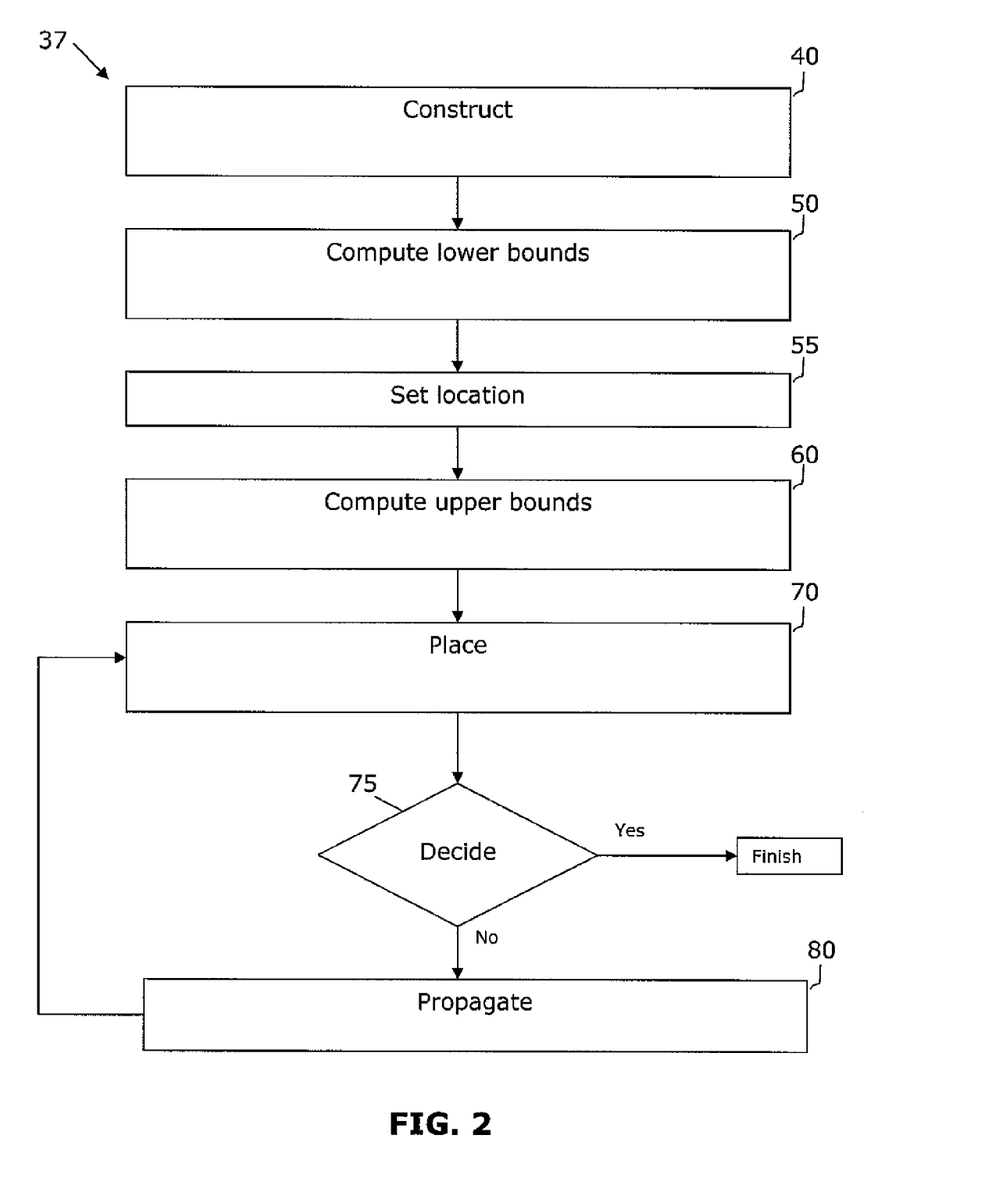
FIG. 2 shows an aspect of the invention.

FIG. 2 is a flow diagram implementing steps of the invention. FIG. 2 may equally represent a high-level block diagram of the invention. The steps of FIG. 2 (and all of the flow diagrams) may be implemented and executed from either a server, in a client server relationship, or they may run on a user workstation with operative information conveyed to the user workstation to create the navigation outlined above. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-Rom), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

FIG. 2 shows a flow diagram implementing steps of the minimum layout perturbation-driven graph-based grid legalization (MP-GGL) solver for flat layout with multiple grid constraints, according to embodiments of the invention. In general terms, the MP-GGL solver 37 includes: constructing at step 40, computing lower bounds at step 50, setting location at step 55, computing upper bounds at step 60, placement at step 70, deciding at step 75, and propagating at step 80. The steps are described in detail below.

More particularly, step 40 of the MP-GGL solver 37 includes constructing a constraint graph to represent layout objects and constraints, recording grid constraints for each node, and recording the topological order of the nodes. More particularly, the input layout that is to be legalized and the known constraints are modeled as a graph where each layout object is represented by a node and the spacing constraints between layout objects are represented by arcs between nodes.

In implementations, a constraint graph is used to represent the ground rule constraints. Without loss of generality, the legalization in the x-direction is described. The legalization in the y-direction can be performed similarly. In the x-direction, each node $n_i$ in the graph represents an edge of a layout object $v_i$. The term $x(v_i)$ denotes the x-location of layout element $v_i$, and $x^{old}(v_i)$ denotes the initial x-location of a layout element $v_i$ in the given layout. The constraint specified by a ground rule between two layout elements $v_i$ and $v_j$ is represented by a difference constraint of the form $x(v_j)-x(v_i)>=w_{ij}$ (the equality constraint can be expressed by two difference constraints). The constraint corresponds to a directed arc, $a_{ij}=(n_i, n_j)$, from node $n_i$ to node $n_j$ with weight $w_{ij}$ in the constraint graph, where $n_i$ is called arc tail and $n_j$ is called arc head. The initial distance between two objects is given by $d_{ij}=x^{old}(v_j)-x^{old}(v_i)$. If $d_{ij}$ is greater than or equal to $w_{ij}$, then a directed arc in the form of a constraint arc is built from $n_i$ to $n_j$ with an arc weight of $w_{ij}$. However, if $d_{ij}$ is less than $w_{ij}$, then a directed arc in the form of a constraint arc is built from $n_i$ to $n_j$ with an arc weight of $d_{ij}$, and an objective arc is built from $n_i$ to $n_j$ with an arc weight of $w_{ij}$. Two extra nodes are added into the constraint graph: a source which represents the left boundary of the layout and a sink which represents the right boundary of the layout. Arcs from the source to any other node except the sink, and arcs from any other node except the source to the sink are added to the constraint graph.

In addition, each node $n_i$ is associated with a grid constraint: being placed on grid of $g_iX$. The grid constraint can be expressed as: $x(v_i)=g_i \times x'(v_i)$, where $x'(v_i)$ is an integer.

In embodiments, the nodes $n_i$ are sorted based on non-decreasing order of their original locations. This sort order is referred to as topological order. An arc, $a_{ij}=(n_i, n_j)$, is a forward arc if $n_i$ is less than $n_j$ in the topological order. And an arc, $a_{ij}=(n_i, n_j)$, is a backward arc if $n_j$ is less than $n_i$ in the topological order.

Step 50 of the MP-GGL solver 37 includes computing lower bounds. In embodiments, step 50 comprises computing the lower bound of each unplaced node by computing the grid longest path from source to sink in the constraint graph, including positive cycle detection and positive cycle removal. More particularly, the lower bound of the possible on-grid location of each node is obtained by computing the grid longest path from the source. The grid longest path is computed beginning with the source by compacting all layout objects to the left boundary subject to the given set of ground rule constraints and multiple grid constraints. The value of a node is the lower-bound of valid on-grid locations to place the corresponding object in the layout. Computing the grid longest path, at step 50, includes the operation of positive cycle removal, which is described in detail below.

Computing the longest path (and the shortest path) in a directed graph without grid constraints has known solutions which may be implemented with the invention. For example, a well known solution involves iteratively labeling arcs between nodes. In each iteration, all of the arcs are labeled by updating the value of the arc head based on the arc weight and the value of the arc tail. At each iteration, each node is visited in order in a forward pass and its forward arcs are labeled, and then each node is visited in reverse order in a backward pass and its backward arcs are labeled. In this way, it takes a theoretical maximum number of iterations for the labeling process to converge. If the labeling process converges within the iteration bound, then the longest path is well defined. If, however, the labeling process does not converge within the iteration bound (e.g., the number of iterations exceeds the bound and the labeling operation still updates the value of some node), then a positive cycle exists.

With grid constraints taken into account, the longest path can still be computed by iteratively labeling the arcs. In each labeling operation, however, the value of the arc head is rounded up to the next grid location in embodiments. The previously known theoretical iteration bounds do not apply when grid constraints are considered because a node may now appear multiple times in the grid longest path due to the rounding up. Equation (1) states the iteration bound in computing the longest path in a graph with multiple grid constraints in accordance with the invention:

$$\text{MIN}\left(\left(\sum_{i=1}^{L} \alpha_i \frac{g_{LCM}}{g_i}\right) \Big/ 2, \sum_{i=11}^{L} \left(\beta_i \frac{g_{LCM}}{g_i}\right)+1\right) \quad (1)$$

where: $g_i$ is a set of grids $\{g_i, i=1, \ldots, L\}$;
$\alpha_i$ is the number of a node required on $g_i$;
$\beta_i$ is the number of backward arcs such that the max grid of the two nodes it connects is $g_i$; and
$g_{LCM}$ is the least common multiple of all $g_i$, $i=1, \ldots L$.

Thus, embodiments of the invention provide a tool for identifying a positive cycle during the calculation of the grid longest path, at step 50. If the number of iterations to compute the grid longest path, at step 50, exceeds the iteration bound given by Equation (1), then a positive cycle exists. If there is a positive cycle on the grid longest path from source to sink in the constraint graph, it means that the layout is over-constrained and that all of the constraints cannot be met. The existence of a positive cycle thus represents a non-desired condition.

Embodiments of the invention comprise a method to identify and resolve a positive cycle by identifying minimum bad arcs which cause the positive cycle and relaxing their arc weight while preserving LVS correctness. This allows LVS correctness to be maintained during generation of an on-grid solution with some ground error spacing violations.

In embodiments, positive cycle removal is performed when a positive cycle is detected due to the number of iterations in the grid longest path calculation exceeding the iteration bound given by Equation (1). The arcs triggering the value update of some nodes are marked as "potential bad" arcs and put into an array. The "potential bad" arcs in the array are sorted to maintain LVS correctness as much as possible. The sorting is based upon the following priority. First, constraint arcs which are critical for LVS correctness are grouped. Second, constraint arcs which are not critical for LVS correctness are grouped and sorted in arc weight non-decreasing order. Third, objective arcs are grouped and sorted in arc weight non-decreasing order.

Not all the "potential bad" arcs are "true bad" arcs, however. A binary search is used to find the "true bad" arc or arcs. The arcs in the second half of the array are marked as "bad". Then the grid longest path is recomputed, with those arcs marked as "bad" ignored in the labeling operation. One of the following actions is taken based on the result: if the grid longest path computation converges within the iteration bound given by Equation (1), then the arcs in the first half of the array are "good" arcs and the size of "potential bad" arcs is reduced by half. The search process is continued on the second half of the array, recursively. If, however, the grid longest path computation does not converge within the iteration bound given by Equation (1), then there exists at least one "true bad" arc in the first half of the array. The first half of the array is then recursively searched until the "true bad" arc is found.

In this way, a "true bad" arcs can be identified. It should be noted that the search process should be continued on the rest of "potential bad" arcs, since there may exist some other "true bad" arcs. The number of iterations to identify the "true bad" arcs is bounded by b(log p), where b is the number of "true bad" arcs and p is the number of "potential arcs" that were identified.

Once all "true bad" arcs are identified, the "true bad" arcs may be "relaxed" by reducing their weight to a smaller value (or ignoring the arc altogether). The objective arcs are first considered for relaxation, since they are the least critical, as described above. The relaxation of certain "true bad" arcs resolves the positive cycle (e.g., positive cycle removal) and allows LVS correctness to be maintained during generation of an on-grid solution with some ground error spacing violations.

Still referring to FIG. 2, step 55 of the MP-GGL solver 37 comprises a set location step. For example, let GLP (source→sink) denote the grid longest path distance from the source to sink, and the $x^{old}_g(v_i)$ denote the nearest grid location of the original location of a layout object $v_i$. The maximum $x^{old}_g(v_i)$ of all the layout objects is denoted as MAX ($x^{old}_g(v_i)$). In embodiments, step 55 comprises setting the sink location to be GLP(source→sink) if MAX($x^{old}_g(v_i)$) ≦GLP(source→sink), or MAX($x^{old}_g(v_i)$) if GLP(source→sink)<MAX($x^{old}_g(v_i)$).

Step 60 of the MP-GGL solver 37 comprises computing upper bounds. In embodiments, step 60, comprises computing the upper bound of each node by inversing the direction and weight sign of all arcs and computing the grid shortest path from sink to source. More particularly, the upper bound of the possible on-grid locations of each node is obtained by computing the grid shortest path from the sink to source in a reversed graph (where arc direction and arc weight sign are reversed). The shortest path is computed beginning with the sink by compacting all layout objects to the right (one side) boundary subject to the given constraints. Expansion of the layout area may be needed in order to contain all the objects. In this way, the upper bound of valid on-grid locations to place each node is obtained.

As further shown in FIG. 2, step 70 is a placement step. In embodiments, after the lower bounds and upper bounds for each node are determined, step 70 includes placing the next node in the topological order (pertaining to the original node location) on the grid which is closest to the node original location and which is between the node upper bound and lower bound.

Step 75 is a decision step. In embodiments, after a node is placed on-grid, it is determined if all of the nodes have been placed on-grid. If all of the nodes have been placed on-grid, then the MP-GGL solver 37 is complete. If, however, there remain nodes that have not been placed on-grid, then the MP-GGL solver proceeds to a propagation step 80.

In embodiments, step 80 comprises updating the lower and upper bounds for the remaining (e.g., un-placed) nodes, and placing the next node in the topological order on-grid as previously described. For example, the first node in the topological order is placed on the grid position that is between its lower bound and upper bound and closest to the original node location. The location of the first node is then set, and its location is propagated to remaining unplaced nodes (e.g., those nodes not yet placed on a grid) for updating (e.g., re-calculating) their lower bounds and upper bounds. After the upper and lower bounds of the remaining unplaced nodes have been updated, the second node in the topological order is placed on the grid position that is between its updated lower bound and updated upper bound and closest to its original location. The location of the second node is then set and is propagated to the remaining unplaced nodes for updating their lower bounds and upper bounds. The process is repeated until all of the nodes have been placed on-grid.

After all of the nodes have been placed on-grid by the MP-GGL solver 37, the result is a legalized layout which meets the multiple grid constraints while maintaining LVS correctness and fixing ground rule errors as much as possible with minimum layout perturbation from the input design. In this manner, all of the objects of the layout are placed on-grid and LVS correctness is maintained, resulting in improved chip functionality and manufacturability.

Figure 3:
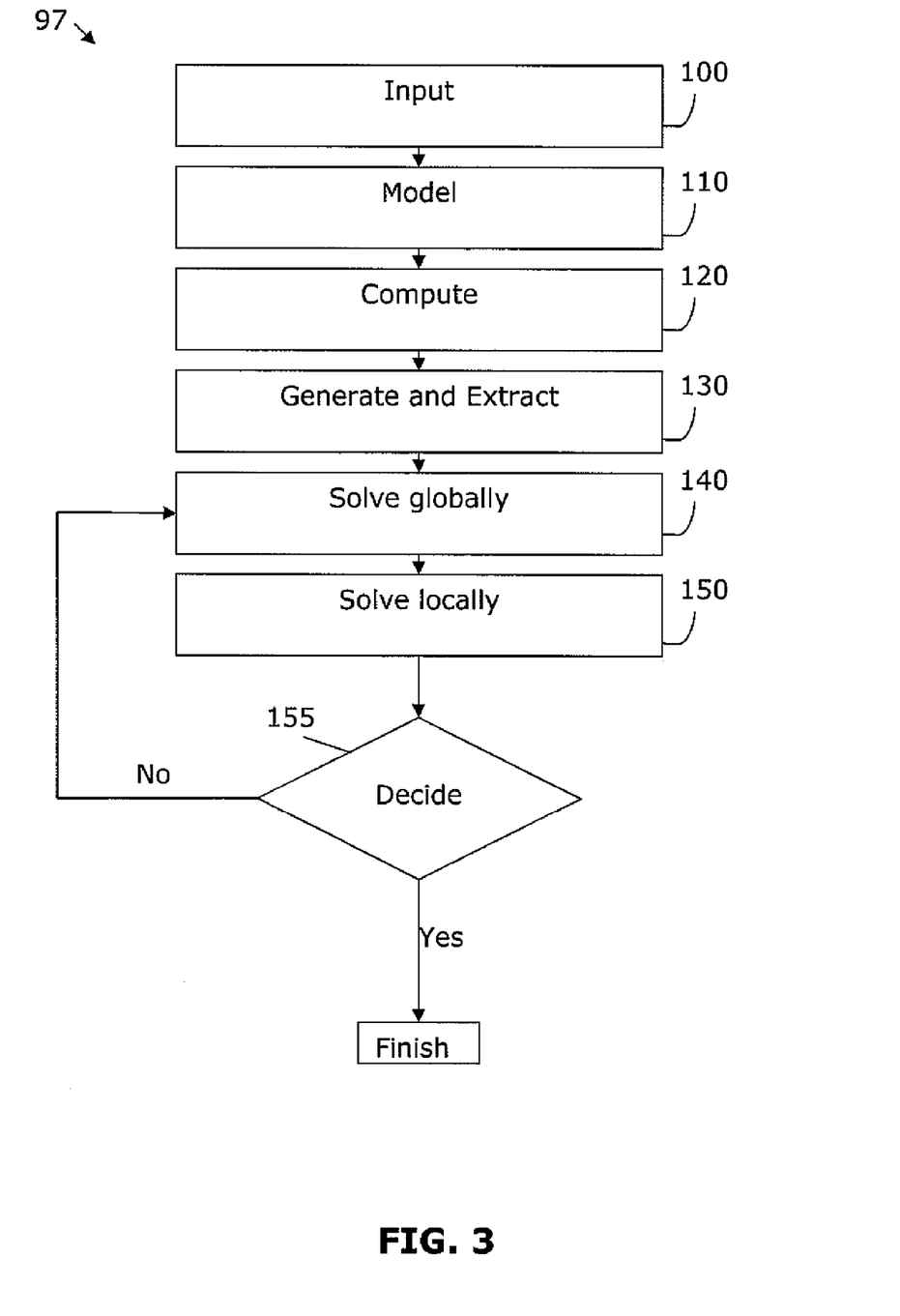
FIG. 3 shows another aspect of the invention.

FIG. 3 shows a flow diagram implementing steps of a method for legalizing a hierarchical layout with multiple grid constraints in accordance with embodiments of the invention. In general terms, hierarchical solver 97 comprises: defining the problem at steps 100, 110, 120, and 130; solving globally at step 140; solving locally at step 150; and iterating between the global solving and local solving processes based on the hierarchy. The steps are described in detail below.

As shown in FIG. 3, step 100 of the hierarchical solver 97 includes an input step. In embodiments, step 100 comprises providing the input layout to be legalized, and inputting the ground rules and grid constraints. Such is known in the art.

Step 110 includes modeling. In embodiments, step 110 comprises modeling the native objects and transforms as a set of variables $|V|=\{E_{mi}, T_{mt}\}$, recording the grid constraints, and formulating the problem as a linear programming (LP) problem. Known methods of solving an integer linear programming (ILP) problem cannot handle grid constraints and fail to return an on-grid solution. Therefore, instead of using an ILP solver, embodiments of the invention use a LP solver as a global solver for the whole layout and the MP-GGL solver 37 as a local solver for each cell in an iterative fashion. As already described, this use of the MP-GGL solver 37 allows for all of the objects of the layout are placed on-grid and LVS correctness is maintained, resulting in improved chip functionality and manufacturability.

Still referring to FIG. 3, step 120 involves computing. In embodiments, step 120 comprises computing the grid longest path from source to sink in a flat (not hierarchical) constraint graph of the layout. Bad arcs are marked and any positive cycle is removed, if necessary. Step 130 may use the same grid longest path and positive cycle removal methodology already described at step 50.

Step 130 involves generating the hierarchical constraints and extracting the transitive constraints. The process of generating and extracting hierarchical constraints and transitive constraints is described in co-pending U.S. patent application Ser. No. 11/279,758 now U.S. Patent Application Publication No. 2007/0245283, the disclosure of which is herein incorporated by reference in its entirety.

Generally speaking, hierarchical constraints are constraints between cells in a hierarchy. With the known hierarchical information of the layout, the hierarchical constraints can be extracted from the flat constraint graph of the layout. The complete set of hierarchical constraints is represented by the set |HierCnst|. Transitive constraints are not shown in a flat constraint graph of the layout, but rather correspond to a path in the flat constraint graph. The transitive constraints may be implicitly derived from the arcs in the flat constraint graph as described in co-pending U.S. patent application Ser. No. 11/279,758 (Attorney Ref. No. IBM BUR920050220US1) now U.S. Patent Application Publication No. 2007/0245283. The complete set of transitive constraints is represented by the set |TranCnst|.

More particularly, step 130 may comprise, for example, generating a hierarchical constraint set |HierCnst| from the flat constraint graph. Arcs connecting nodes in the flat constraint graph are mapped. If the arc is marked "true bad" by the grid longest path operation, then the node distance in the original layout of the "true bad" arc is used as the constraint value in |HierCnst|. Otherwise, if the arc is not marked "true bad" by the grid longest path solution (e.g., algorithm), then the grid longest path distance between the nodes is used as the constraint value for the |HierCnst| instead of using the ground rule value as the constraint value. The transitive constraint set |TranCnst| of each cell is extracted from the flat constraint graph As further depicted in FIG. 3, step 140 involves globally solving the linear programming problem. In embodiments, step 140 comprises using a global solver to solve the linear programming problem with the current variable set |V| to meet the current hierarchical constraint set |HierCnst|, but without taking into account the grid constraints. The global solver may be any generic solver that solves the LP problem with a minimum perturbation objective. For example, a solver such as that disclosed in U.S. Pat. No. 6,189,132 may be used. The results from the global solving step provide an initial solution (e.g., locations for objects in the layout) without taking into consideration any grid constraints. These results are next fed to the local solver to meet the grid constraints (e.g., place objects on grids).

Step 150 of the hierarchical solver 97 includes solving locally. In embodiments, step 150 comprises locally solving each cell individually, where an individual cell may be represented by $M_i$. More particularly, for cells that do not contain an un-gridded nested cell (e.g., cells that do not contain nested cells, and/or cells that do contain a nested cell in which the nodes of the nested cell have already been placed on-grid), a constraint graph for the cell $M_i$ is built. The constraint graph represents the intra-cell constraint sets |HierCnst$_{mi}$| and |TranCnst$_{mi}$|, which were determined at step 130. The MP-GGL solver 37 is run based upon this constraint graph for cell $M_i$. The MP-GGL solver 37 places any native object $E_{mi}$ of the cell and any nested transform $T_{mt}$ of the cell on a grid. (Here, both objects $E_{mi}$ and transforms $T_{mt}$ correspond to objects $v_i$ described at step 40.) Any objects $E_{mi}$ and/or transforms $T_{mt}$ that are placed on-grid by the MP-GGL solver 37 are then removed from the variable set |V| according to |V|=|V|−{$E_{mi}$, $T_{mt}$}. Likewise, any constraints that are no longer needed are removed from the constraint set |HierCnst| according to |HierCnst|=|HierCnst|−{HierCnstmi}.

Still referring to FIG. 3, step 155 of the hierarchical solver 97 includes a decision step. In embodiments, the hierarchical solver 97 determines if all of the objects and transforms of the layout have been placed on-grid. If all objects and transforms have been placed, then the process is complete. However, if all objects and transforms have not been placed, then the updated variable set |V| and constraint set |HierCnst| are sent back to the global solving step 140. The process is repeated until all of the objects are placed on a grid. The result is a legalized layout that meets the multiple grid constraints while maintaining LVS correctness and fixing the ground rule errors as much as possible with minimum layout perturbation from the input design.

EXAMPLE OF USE

Figure 4:
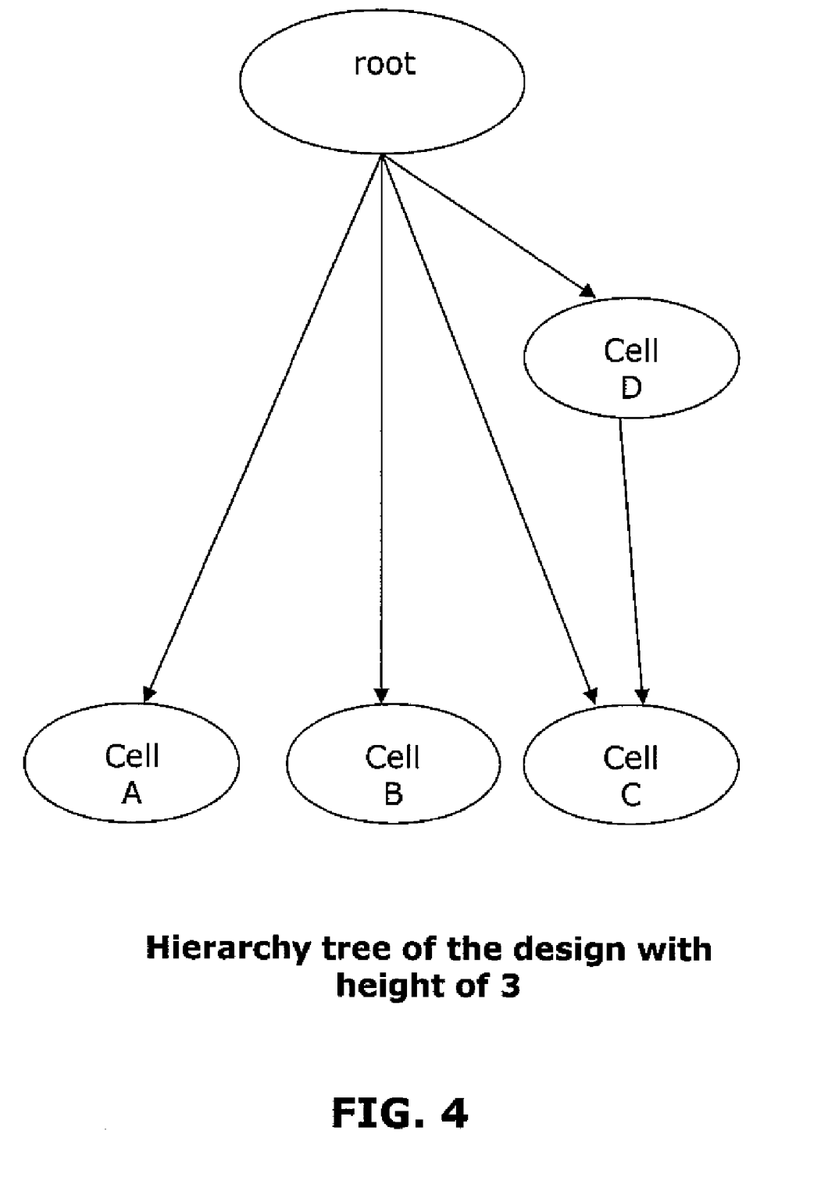
FIG. 4 shows an exemplary hierarchy tree according to the invention.

FIG. 4 shows an example of a hierarchy tree of a design layout with cells A, B, C, and D, and three levels of the hierarchy. Cells A, B, and C are on a first level of the hierarchy. Cell D is on a second level of the hierarchy. The root is on a third level of the hierarchy. As seen in FIG. 4, Cell C is nested in Cell D.

Figure 5:
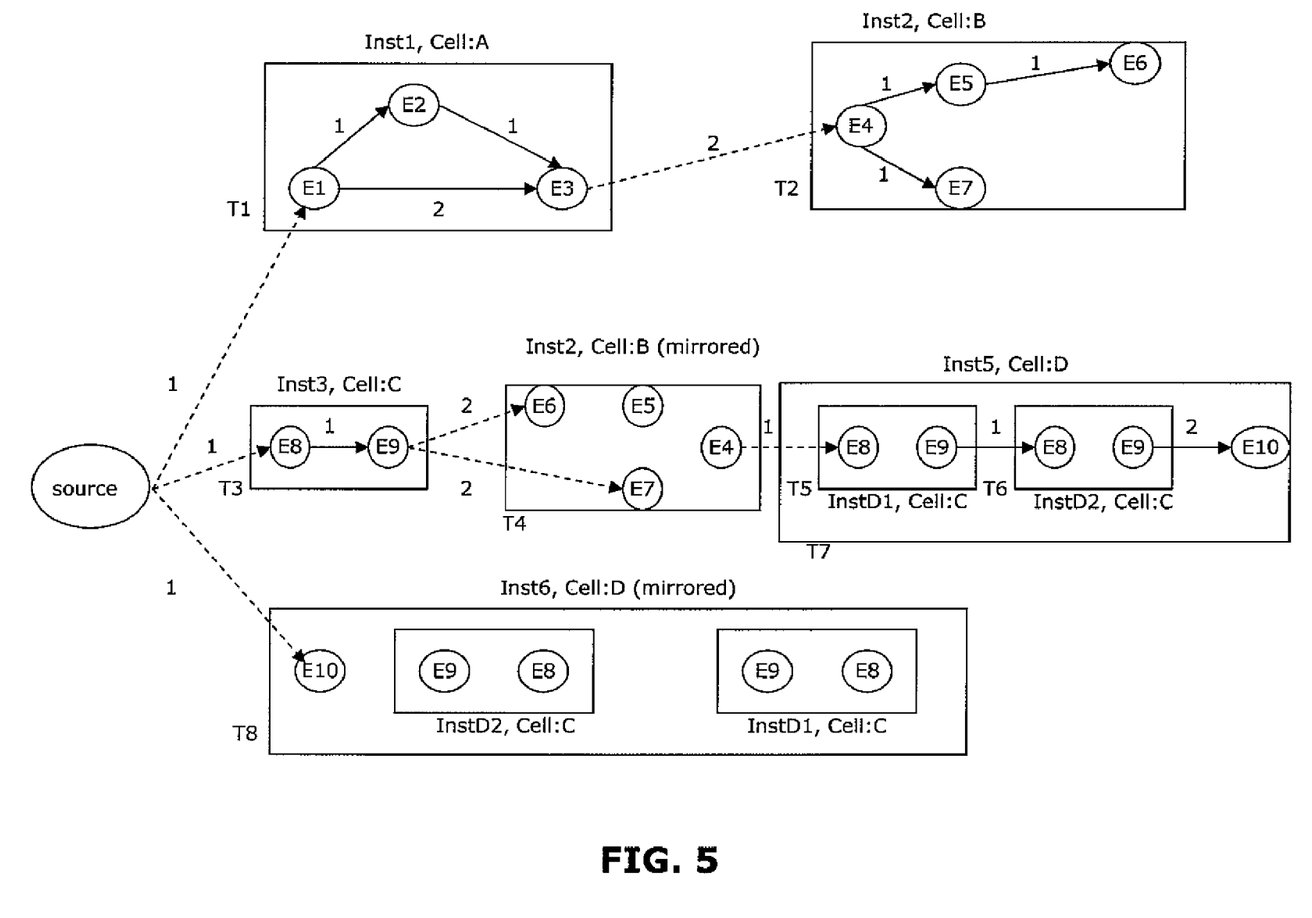
FIG. 5 shows an exemplary flat constraint graph according to the invention.

FIG. 5 shows a flat constraint graph corresponding to the exemplary hierarchy tree of FIG. 4. The flat constraint graph contains cells A-D, with exemplary objects $E_{1-10}$ and transforms $T_{1-8}$. The flat constraint graph also depicts hierarchical constraints.

For example, as shown in FIG. 5, Instance 1 of Cell A includes a grouping of three objects: $E_1$, $E_2$, and $E_3$. The objects correspond to nodes $n_i$ for the purposes of the MP-GGL solver 37, and represent shapes in the layout such as, for example, gates. The solid arc between $E_1$ and $E_2$ represents an intra-cell spacing constraint between the objects. The spacing constraint may be a ground rule that requires that the objects be spaced apart by 1 unit of measurement. Similarly, the arc between $E_1$ and $E_3$ represents a spacing constraint that requires the objects to be spaced apart by two units of measurement.

Still referring to FIG. 5, the objects $E_1$, $E_2$, and $E_3$ of Cell A are grouped as a first transform $T_1$. The dashed arc between $E_1$ and the source represents an inter-cell constraint. For example, as depicted in FIG. 5, the object $E_1$ must be spaced apart form the source by 1 unit. This constraint relates the various cells to each other. The spacing constraints for the remaining objects and transforms are constructed and shown as one of ordinary skill in the art would now understand.

The hierarchical constraint set is derived from the flat constraint graph shown in FIG. 5. Thus, |HierCnst| is given by {$C_A$, $C_B$, $C_C$, $C_D$, $C_{root}$}, where:

$C_A$: $E_2-E_1 \geq 1$, $E_3-E_1 \geq 2$, $E_3-E_2 \geq 1$;

$C_B$: $E_5-E_4 \geq 1$, $E_6-E_5 \geq 1$, $E_7-E_4 > 1$;

$C_C$: $E_9-E_8 \geq 1$;

$C_D$: $(T_6+E_8)-(T_5+E_9) \geq 1$, $E_{10}-(T_6+E_9) \geq 2$;

$C_{root}$: $(T_1+E_1)$-source$\geq 1$, $(T_3+E_8)$-source$\geq 1$, $(T_8-E_{10})$-source$\geq 1$, $(T_2+E_4)-(T_1+E_3) \geq 2$, $(T_4-E_6)-(T3+E_9) \geq 2$, $(T_4-E_7)-(T_3+E_9) \geq 2$, $(T_7+T_5+E_8)-(T_4-E_4)\geq 1$.

Figure 6A:
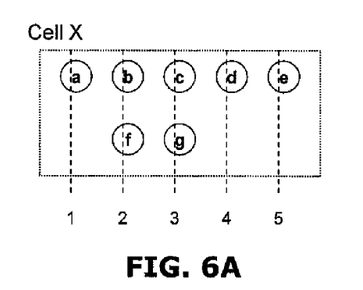
FIGS. 6A-6C show the construction of an exemplary constraint graph showing hierarchical constraints according to the invention.
Figure 6B:
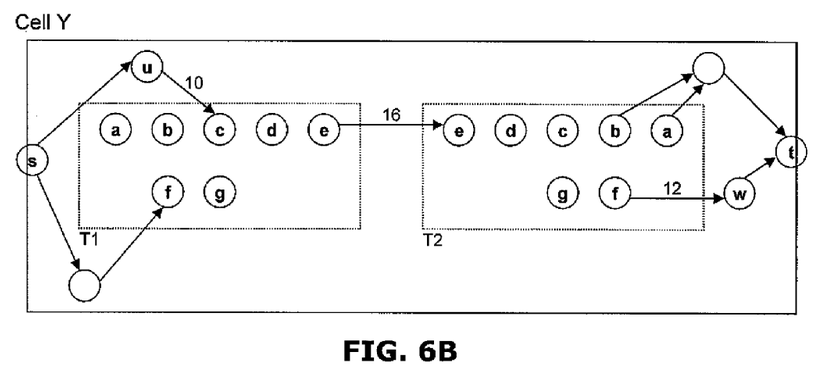
Figure 6C:
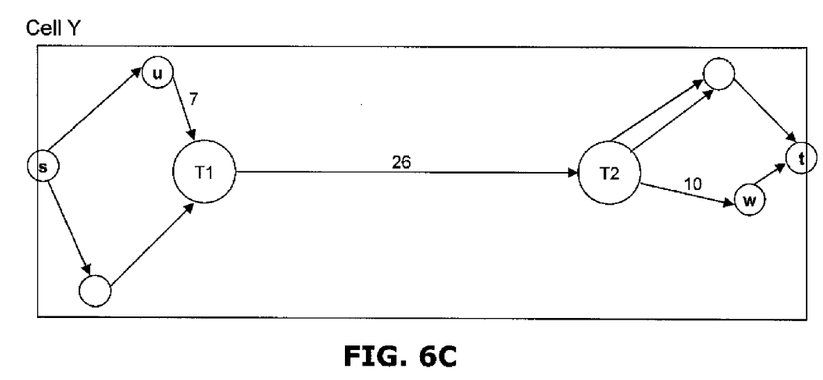

FIGS. 6A-6C depict the construction of an exemplary constraint graph for a cell with hierarchical constraints, as is required for local solving when there are already-gridded nested cells. FIG. 6A shows Cell X containing nodes a-g, which have already been placed on grid (e.g., in a previous iteration of the solver). The nodes have been placed on grids 1-5, as shown.

FIG. 6B shows a constraint graph of Cell Y, which contains nodes u and w (among others) and transforms T1 and T2. The transforms T1 and T2 are instances of the child (or nested) Cell X that are nested in parent Cell Y, with transform T2 being mirrored.

Implementations of the invention provide not only for the placement of critical objects (e.g., gates) on-grid, but also for the placement of transforms (and other non-critical objects) on grid. Each transform $T_{mt}$ of a cell $C_{mt}$ is associated with a grid constraint: being placed on grid of $g_{mt}X$, where $g_{mt}$ is the least common multiple of all the grid constraint $g_i$ of each layout object $v_i$ in Cell $C_{mt}$. Thus, the legalization of Cell Y will include the placement of the transforms T1 and T2 on-grid. However, since the nodes of Cell X have already been gridded, they will not be moved relative to one another in the legalization of Cell Y. Rather, in embodiments, the entire transform will be moved as a unit.

FIG. 6B also shows constraint arcs. The arcs that connect nodes of Cell Y to nodes of the transforms (e.g., Cell X) represent previously determined hierarchical constraints between the cells. For example, the arc between node "u" and node "c" represents a hierarchical constraint with a weight of 10. Node "c", being subject to a hierarchical constraint, is called a "port node".

Any hierarchical constraint arcs that connect to port nodes are adjusted in weight such that the arc is drawn to an origin of the transform instead of the port node. This allows the transform to be placed on grid without moving the individual nodes of the cells within the transform that are already spaced properly. For example, it is known that the arc from node u to node c has a weight of 10. Thus, the hierarchical constraint is given by the expression $(T1+c)-u \geq 10$. But it is also known from FIG. 6A that c=3. Thus, the expression of the hierarchical constraint may be adjusted based on this value of node c, resulting in an adjusted hierarchical constraint $T1-u \geq 7$. Similarly, knowing from FIG. 6A that f=2, then the hierarchical constraint $w-(T2-f) \geq 12$ may be adjusted to $w-T2 \geq 10$. And, knowing from FIG. 6A that e=5, the hierarchical constraint $(T2-e)-(T1+e) \geq 16$ can be adjusted to $T2-T1 \geq 26$. The same can be done for all hierarchical constraint arcs of Cell Y.

FIG. 6C shows the constraint graph of cell Y with the transforms T1 and T2 modeled as single elements, instead of showing the nodes of the nested Cell X. The adjusted arc weights that were derived above are also depicted. In this way, during the legalization of Cell Y, the transforms will be placed on grid as single entities. In this manner, the nodes of nested Cell X will remain on a grid.

Figure 7:
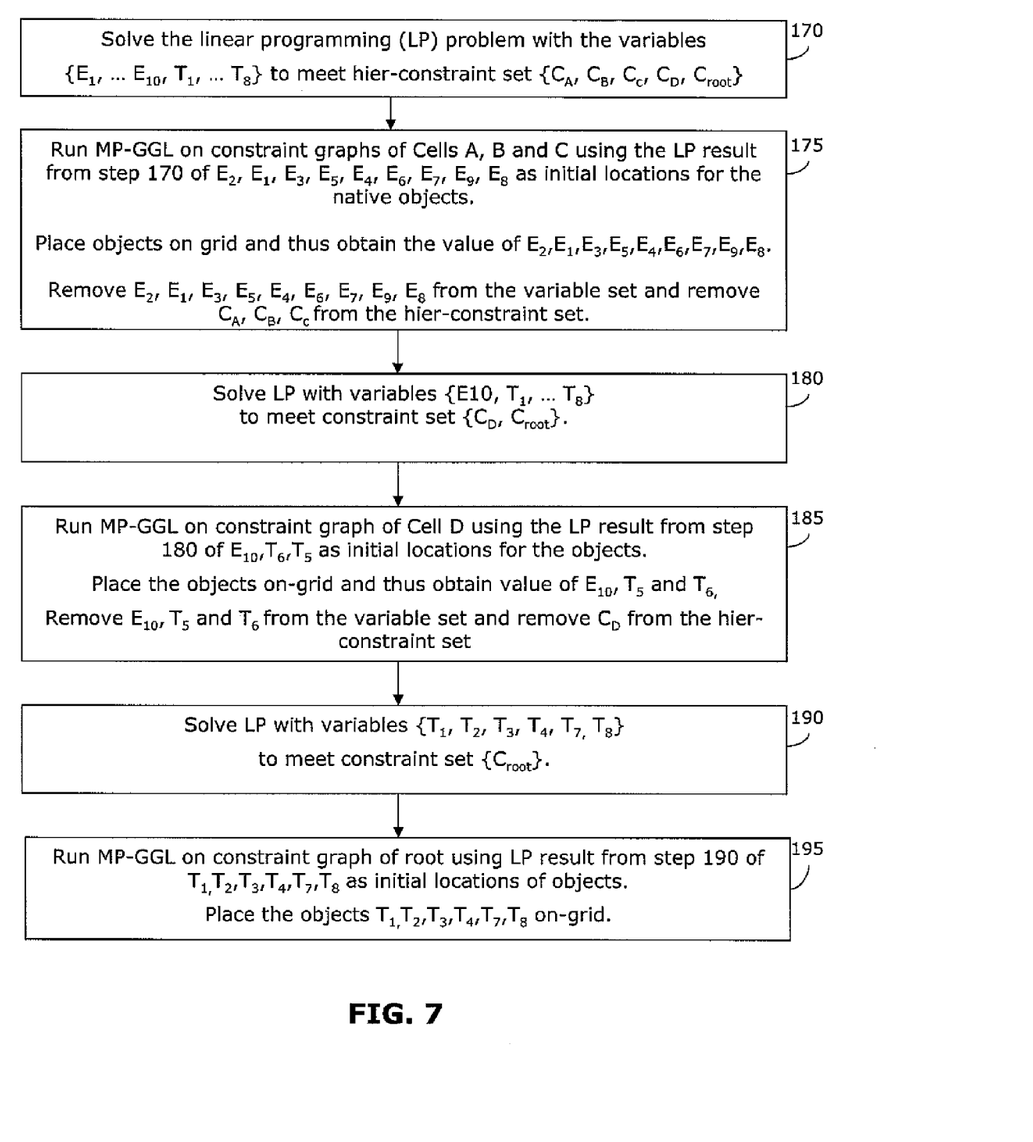
FIG. 7 shows an exemplary iteration according to the invention.

FIG. 7 shows exemplary steps for legalizing the layout depicted in FIGS. 4 and 5. At step 170, the linear programming (LP) problem is solved with the current variable set to meet the current hierarchical constraint set. The solution of the LP problem provides initial locations for the objects.

At step 175, the MP-GGL solver is run on the lowest level of cells in the hierarchy (e.g., each cell that does not contain an ungridded nested cell). For example, it can be seen from FIGS. 4 and 5 that cells A, B, and C are initially at the lowest level of the hierarchy, and none contain ungridded nested cells. The MP-GGL solver uses the initial locations for the objects provided by step 170. The MP-GGL solver places the objects ($E_1$ through $E_9$) of the cells (A, B, C) on-grid. Once the objects are placed on-grid, those objects are removed from the variable set and those hierarchical constraints are removed from the hierarchical constraint set.

At step 180, the LP problem is solved with the remaining (e.g., current) variable set to meet the remaining (e.g., current) hierarchical constraint set. At step 185, the MP-GGL solver is run on the next level of cells in the hierarchy (e.g., cell D). The MP-GGL solver uses the initial locations for the objects provided by step 180. The MP-GGL solver places the objects ($E_{10}$, $T_6$, $T_5$) of the cell (D) on-grid. Once the objects are placed on-grid, those objects are removed from the variable set and those hierarchical constraints are removed from the hierarchical constraint set.

The iterative process is repeated once again at steps 190 and 195 for the last level of the hierarchy, such that all of the objects $E_{1-10}$ and $T_{1-8}$ are placed on-grid. As the skilled artisan will recognize, the process could be applied to a layout with different number of cells and objects, and a different hierarchical design, than that shown in the exemplary embodiments depicted by FIGS. 4-7. In this manner, any hierarchical layout with multiple grid constraints may be legalized, thus improving chip manufacturability and functionality.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While the invention has been described in terms of embodiments, those skilled in the art will recognize that the invention can be practiced with modifications and in the spirit and scope of the appended claims.

What is claimed:

1. A method for designing a circuit layout comprising:
   determining an ordering of a plurality of nodes in a constraint graph according to their respective locations in the circuit layout;
   computing a lower bound and an upper bound for at least a first of the plurality of ordered nodes; and
   based on the computing, placing the first node of the plurality of ordered nodes on any one of a plurality of grids that is nearest its original location and between the computed lower bound and the computed upper bound of the first node.

2. The method of claim 1, wherein computing the lower bound comprises computing a grid longest path from a source to a sink of the constraint graph.

3. The method of claim 2, further comprising checking for a positive cycle.

4. The method of claim 3, further comprising removing the positive cycle.

5. The method of claim 4, wherein removing the positive cycle comprises relaxing a weight of a bad arc.

6. The method of claim 1, wherein computing the upper bound comprises computing a grid shortest path from a sink to a source of the constraint graph.

7. The method of claim 1, further comprising:
repeating the computing step with remaining non-placed nodes of the plurality of ordered nodes to determine a lower bound and an upper bound for each of the non-placed nodes;
based on the repeating step, placing a next of the non-placed nodes on any one of the plurality of grids that is nearest its original location and between the determined lower bound and the determined upper bound of the next of the non-placed nodes; and
repeating the repeating and placing steps until all nodes of the plurality of nodes are placed on any one of the plurality of grids.

8. A method of legalizing a layout of an integrated circuit having multiple grid constraints, comprising:
formulating a linear programming problem based upon a variable set and a constraint set;
solving the linear programming problem to provide an initial solution that meets hierarchical constraints without taking into consideration grid constraints; and
based upon the initial solution, producing on-grid results for objects in the layout.

9. The method of claim 8, wherein the objects comprise shape objects and transforms of the layout.

10. The method of claim 9, wherein the formulating comprises modeling the shape objects and transforms as a set of variables.

11. The method of claim 10, wherein the constraint set comprises a hierarchical constraint set, and the formulating further comprises generating the hierarchical constraint set and extracting a transitive constraint set.

12. The method of claim 11, wherein the solving comprises solving the linear programming problem under a minimum-perturbation objective with the variable set to meet the hierarchical constraint set, but without grid constraints.

13. A computer readable medium, embedded thereon a computer program product that, when executed by a computer, causes the computer to perform the method of claim 8.

14. A method of legalizing a layout of an integrated circuit having multiple grid constraints, comprising:
formulating a linear programming problem based upon a variable set and a constraint set;
solving the linear programming problem to provide an initial solution; and
based upon the initial solution, producing on-grid results for objects in the layout,
wherein the objects comprise shape objects and transforms of the layout,
the formulating comprises modeling the shape objects and transforms as a set of variables,
the constraint set comprises a hierarchical constraint set, and the formulating further comprises generating the hierarchical constraint set and extracting a transitive constraint set,
the solving comprises solving the linear programming problem under a minimum-perturbation objective with the variable set to meet the hierarchical constraint set, but without grid constraints, and
the producing comprises:
constructing an intra-cell constraint graph of a cell;
determining an order of a plurality of nodes in the layout according to their respective locations on the intra-cell constraint graph;
computing a lower bound for each of the plurality of nodes;
computing an upper bound for each of the plurality of nodes; and
placing a next node in the order of the plurality of nodes on a grid between its upper bound and its lower bound and as close as possible to its original location.

15. The method of claim 14, further comprising:
removing shape objects of the cell and transforms of the cell from the variable set and hierarchical constraints of the cell from the hierarchical constraint set; and
repeating the solving step, the producing step, and the removing step until all the shape objects and transforms of the layout are placed on-grid.

* * * * *